(12) United States Patent
Furuya et al.

(10) Patent No.: US 11,800,243 B2
(45) Date of Patent: Oct. 24, 2023

(54) IMAGE PICKUP APPARATUS CAPABLE OF PREVENTING IDLE CAPACITY FROM RUNNING SHORT DURING CONSECUTIVE PHOTOGRAPHING WITHOUT INCREASING STORAGE CAPACITY OF STORAGE DEVICE THAT TEMPORARILY RETAINS DATA, CONTROL METHOD FOR IMAGE PICKUP APPARATUS, AND STORAGE MEDIUM

(71) Applicant: CANON KABUSHIKI KAISHA, Tokyo (JP)

(72) Inventors: Kohei Furuya, Tokyo (JP); Hiroaki Kuchiki, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 81 days.

(21) Appl. No.: 17/542,105

(22) Filed: Dec. 3, 2021

(65) Prior Publication Data

US 2022/0182540 A1 Jun. 9, 2022

(30) Foreign Application Priority Data

Dec. 7, 2020 (JP) ................................ 2020-202701

(51) Int. Cl.
*H04N 23/951* (2023.01)
*G06T 1/00* (2006.01)

(52) U.S. Cl.
CPC ......... *H04N 23/951* (2023.01); *G06T 1/0007* (2013.01)

(58) Field of Classification Search
CPC ..... H04N 23/951; H04N 23/80; G06T 1/0007
See application file for complete search history.

(56) References Cited

U.S. PATENT DOCUMENTS

| 9,392,182 | B2 * | 7/2016 | Fujimoto | ............... H04N 23/73 |
| 2006/0152599 | A1 * | 7/2006 | Yokonuma | ........... H04N 1/2158 |
| | | | | 386/E5.072 |
| 2010/0091131 | A1 * | 4/2010 | Furukawa | ............ H04N 23/951 |
| | | | | 348/222.1 |
| 2014/0320692 | A1 * | 10/2014 | Ichikawa | ............. H04N 5/2621 |
| | | | | 348/239 |

FOREIGN PATENT DOCUMENTS

| JP | 2003-274323 A | 9/2003 |
| JP | 2016-206839 | * 12/2016 |

* cited by examiner

*Primary Examiner* — Luong T Nguyen
(74) *Attorney, Agent, or Firm* — Cowan, Liebowitz & Latman, P.C.

(57) ABSTRACT

An image pickup apparatus capable of preventing an idle capacity from running short during consecutive photographing without increasing a storage capacity of a storage device that temporarily retains data is provided. The image pickup apparatus comprising an image pickup unit configured to continuously perform image pickup and obtain raw data, a storage unit configured to temporarily store the raw data, a developing unit configured to develop the raw data, and a control unit configured to control so as to omit a part or all of a development processing of the raw data performed by the developing unit based on a usage status of the storage unit or a similarity degree between images of the raw data.

13 Claims, 5 Drawing Sheets

| EXAMPLE OF TARGET OF OMITTING | EXAMPLE OF OMISSION METHOD | IMAGE DATA TO BE RECORDED |
|---|---|---|
| WHITE BALANCE COLOR MATRIX | PERFORM DEVELOPMENT PROCESSING WITH PARAMETER OF PREVIOUS FRAME<br><br>PERFORM DEVELOPMENT PROCESSING WITH DEFAULT PARAMETER<br><br>PERFORM DEVELOPMENT PROCESSING WITH MONOCHROME PARAMETER | RAW DATA / MONOCHROME JPEG DATA |
| BRIGHTNESS CORRECTION OPTICAL CORRECTION | PERFORM DEVELOPMENT PROCESSING WITH PARAMETER OF PREVIOUS FRAME<br><br>PERFORM DEVELOPMENT PROCESSING IN STATE OF EQUIVALENT TO CORRECTION-OFF | RAW DATA / CORRECTION-OFF JPEG DATA |
| SUBJECT DETECTION | DIVERT RESULT OF PREVIOUS FRAME<br><br>OMIT PROCESSING THAT DEPENDS ON DETECTION RESULT | RAW DATA / SUBJECT POSITION IN PREVIOUS FRAME, JPEG DATA |
| NOISE REMOVAL PROCESSING | REDUCE IMAGE<br><br>APPLY SIMPLE NOISE REMOVAL PROCESSING | RAW DATA / REDUCED IMAGE JPEG DATA |

IMAGE PICKUP APPARATUS CAPABLE OF PREVENTING IDLE CAPACITY FROM RUNNING SHORT DURING CONSECUTIVE PHOTOGRAPHING WITHOUT INCREASING STORAGE CAPACITY OF STORAGE DEVICE THAT TEMPORARILY RETAINS DATA, CONTROL METHOD FOR IMAGE PICKUP APPARATUS, AND STORAGE MEDIUM

BACKGROUND OF THE INVENTION

Field of the Invention

The present invention relates to an image pickup apparatus, a control method for the image pickup apparatus, and a storage medium.

Description of the Related Art

In the process from obtaining of image data to recording when performing image pickup by an image pickup apparatus, generally, processes are performed in the order of obtaining of the image data, temporarily retaining the image data in a storage device, a development processing of the image data, and storing image data generated by the development processing in a storage medium.

Here, in the case of performing consecutive photographing of still images, a relationship between an obtaining speed of image data of one frame and a development processing speed of the image data of one frame affects a consecutive photographing speed (so-called a frame speed). That is, in order for the storage device, which temporarily retains the image data (hereinafter referred to as "a primary storage device"), to retain the obtained image data, it is necessary that a certain amount of an idle capacity remains in the primary storage device. However, the idle capacity of the primary storage device decreases each time the primary storage device retains the obtained image. On the other hand, when the image data generated by the development processing is stored in the storage medium, since original image data corresponding to the image data generated by the development processing becomes unnecessary, the original image data can be erased (deleted) from the primary storage device. In this way, it is possible to increase the idle capacity in the primary storage device by erasing unnecessary image data.

From this, a decreasing speed of the idle capacity in the primary storage is affected by the obtaining speed of the image data, and if the obtaining speed of the image data is fast, the amount of data per unit time of image data retained in the primary storage device will increase, and the decreasing speed of the idle capacity will become fast. On the other hand, an increasing speed of the idle capacity is affected by the development processing speed, and if the development processing speed is fast, the amount of the idle capacity occurring in the primary storage device per unit time will increase, and the increasing speed of the idle capacity will become fast. Therefore, in the case that the decreasing speed of the idle capacity in the primary storage is faster than the increasing speed of the idle capacity in the primary storage, there is a risk that an image pickup operation is interrupted due to running short of the idle capacity of the primary storage.

In response to this problem, for example, Japanese Laid-Open Patent Publication (kokai) No. 2003-274323 has proposed a configuration, in which when image pickup is performed in a state where the idle capacity of a frame memory (the primary storage) is running short, newly obtained image data is overwritten into a storage area of image data that the development processing has not been performed.

However, in the technique disclosed in the above Japanese Laid-Open Patent Publication (kokai) No. 2003-274323, since the newly obtained image data is recorded by overwriting the newly obtained image data on the already obtained image data, the image data that should have already been obtained will be lost. Therefore, although it is necessary to prevent the idle capacity of the primary storage device from running short, adopting a method of increasing a storage capacity of the primary storage device will increase the cost.

SUMMARY OF THE INVENTION

The present invention provides an image pickup apparatus capable of preventing an idle capacity from running short during consecutive photographing without increasing a storage capacity of a storage device that temporarily retains data, a control method for the image pickup apparatus, and a storage medium.

Accordingly, the present invention provides an image pickup apparatus comprising an image pickup unit configured to continuously perform image pickup and obtain raw data, a storage unit configured to temporarily store the raw data, a developing unit configured to develop the raw data, and a control unit configured to control so as to omit a part or all of a development processing of the raw data performed by the developing unit based on a usage status of the storage unit or a similarity degree between images of the raw data.

According to the present invention, it is possible to prevent the idle capacity from running short during the consecutive photographing without increasing the storage capacity of the storage device that temporarily retains the data.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
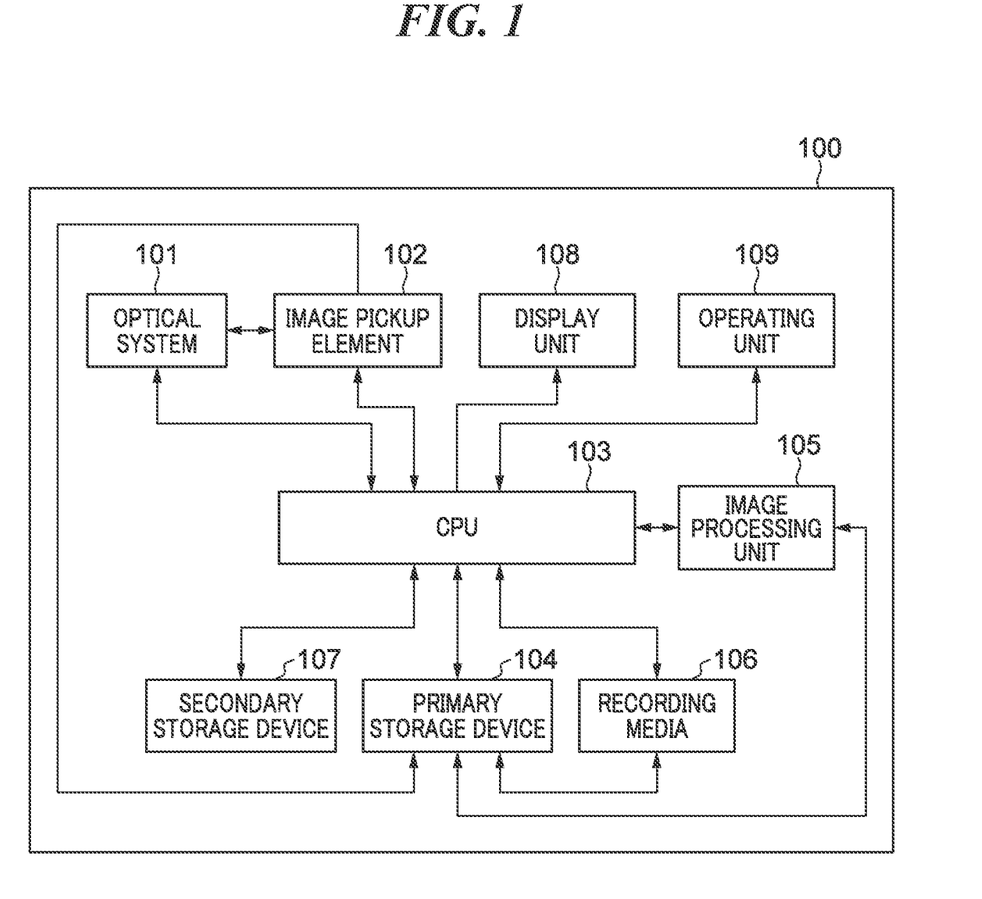
FIG. 1 is a block diagram that shows a basic configuration of an image pickup apparatus according to an embodiment of the present invention.

FIG. 1 is a block diagram that shows a basic configuration of an image pickup apparatus 100 according to an embodiment of the present invention. Although a digital camera and a digital video camera can be mentioned as typical examples of the image pickup apparatus 100, the image pickup apparatus 100 is not limited to the digital camera and the digital video camera, and the image pickup apparatus 100 may be an electronic apparatus having an image pickup function, such as a camera-equipped mobile phone (a smartphone) or a camera-equipped computer.

The image pickup apparatus 100 has an optical system 101, an image pickup element 102, a CPU (Central Processing Unit) 103, a primary storage device 104, an image processing unit 105, a recording medium 106, a secondary storage device 107, a display unit 108, and an operating unit 109.

The optical system 101 includes a lens group, a shutter, an aperture, and the like, and forms an image of incident light from a field to be photographed on the image pickup element 102 as an optical image according to a control signal of the CPU 103. Further, the lens group includes a focus lens, a zoom lens, an image stabilizing lens, which performs correction of camera shake, etc., and the like. The image pickup element 102 is an image pickup device such as a CCD (Charge Coupled Device) image sensor or a CMOS (Complementary Metal Oxide Semiconductor) image sensor, and photoelectrically converts the image of the incident light formed through the optical system 101 (the optical image) to generate image signals (raw data). An image pickup unit configured by the optical system 101 and the image pickup element 102 can continuously perform image pickup and obtain the raw data.

The CPU 103 controls the operation of each unit constituting the image pickup apparatus 100 by executing a predetermined program stored in the secondary storage device 107 or the like according to an input signal or the like. The primary storage device 104 is, for example, a volatile storage device such as a RAM (Random Access Memory), is used for storing temporary data, and is also used as a working memory of the CPU 103. Information stored in the primary storage device 104 may be used by the image processing unit 105, and may also be recorded on the recording medium 106. The secondary storage device 107 is, for example, a nonvolatile storage device such as an EEPROM (Electrically Erasable Programmable Read Only Memory). The secondary storage device 107 stores programs (firmware) for controlling the image pickup apparatus 100 and various kinds of setting information, and these programs and the various kinds of setting information are used by the CPU 103.

The recording medium 106 records image data and the like, which are temporarily stored in the primary storage device 104. The recording medium 106 is, for example, a semiconductor memory card, and is attachable/detachable to/from the image pickup apparatus 100. The image pickup apparatus 100 has an attachment and detachment mechanism for the recording medium 106 and a reading and writing function for the recording medium 106. By detaching the recording medium 106 from the image pickup apparatus 100 and then attaching it to an external apparatus such as a PC (personal computer), the data recorded on the recording medium 106 can be read out to the external apparatus. Moreover, the recording medium 106 may be a hard disk drive or the like, which is built in the image pickup apparatus 100. In this case, by connecting the image pickup apparatus 100 to the external apparatus, the data recorded on the recording medium 106 can be read out to the external apparatus.

The display unit 108 performs display of a live view image at the time of performing the image pickup, display of a photographed image, and display of a GUI (graphic user interface) image or the like for interactive operation. The operating unit 109 is an input device group that accepts various kinds of user operations and transmits information, which is inputted by the user operation, to the CPU 103, and for example, the operating unit 109 includes a button, a lever, a touch panel, etc. Further, an input device using voice, line of sight, or the like can also be used as the operating unit 109.

The image processing unit 105 performs various kinds of processing such as an image processing called a development processing, adjusting a color tone according to a photographing mode, etc. with respect to picked-up image. The image pickup apparatus 100 has a plurality of image processing patterns that can be executed by the image processing unit 105, and is configured to be capable of setting a predetermined image processing pattern as the photographing mode through the operating unit 109. Moreover, at least a part of functions of the image processing unit 105 may be realized by the CPU 103 executing predetermined software.

Figure 2:
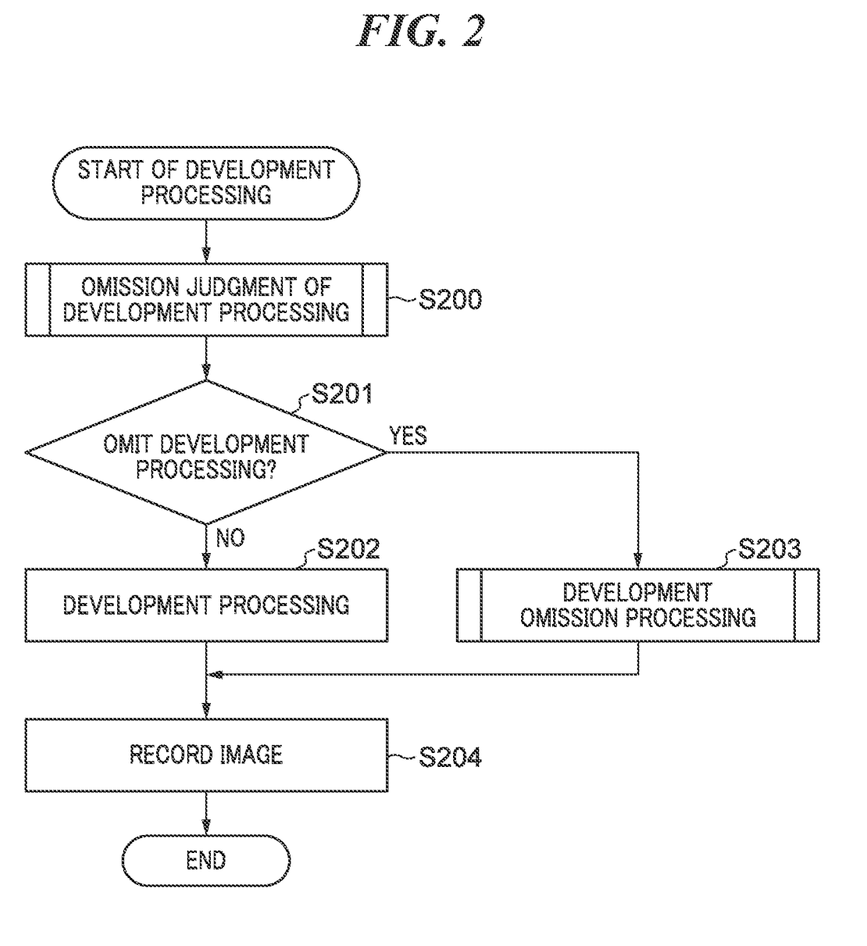
FIG. 2 is a flowchart of a development processing executed by the image pickup apparatus.

Next, the development processing of the picked-up image by the image pickup apparatus 100 will be described. FIG. 2 is a flowchart of the development processing executed by the image pickup apparatus 100. Each processing (step), which is indicated by an S number in the flowchart of FIG. 2, is realized by the CPU 103 expanding the predetermined program, which is stored in the secondary storage device 107, on the primary storage device 104, and controlling the operation of each unit constituting the image pickup apparatus 100 (particularly the image processing unit 105).

When a user of the image pickup apparatus 100 instructs the image pickup device 100 (the CPU 103) to start performing the image pickup via the operating unit 109, the raw data, which is the image signals outputted from the image pickup element 102, is stored in the primary storage device 104, which functions as a storage unit. Subsequently, the development processing performed by the image processing unit 105, which functions as a developing unit, is started, and a processing of a step S201 is started.

In a step S200, the CPU 103, which functions as a control unit, performs an omission judgment of the development processing. In the omission judgment of the development processing, it is judged whether or not to omit a part or all of the development processing with respect to a part of the raw data according to a status of the primary storage device 104. Moreover, the details of the omission judgment of the development processing of the step S200 will be described later. In the step S201, the CPU 103 branches the processing depending on whether or not it is judged in the step S200 that all or a part of the development processing is omitted. In the case that the CPU 103 judges that the development processing is not omitted (NO in the step S201), the CPU 103 advances the processing to a step S202, and on the other hand, in the case that the CPU 103 judges that all or a part of the development processing is omitted (YES in the step S201), the CPU 103 advances the processing to a step S203.

In the step S202, a usual development processing is performed, that is, the development processing is performed with respect to raw data of all frames. On the other hand, in the step S203, a development omission processing is performed. Moreover, the details of the development omission processing of the step S203 will be described later. When the processing proceeds from the step S202 to a step S204, in the step S204, for each image (each frame), the CPU 103, which functions as a recording unit, stores (records) raw data before the development processing and image data generated by the development processing in the recording medium 106 as one set of photographing data, and then the development processing of FIG. 2 ends. In contrast, when the processing proceeds from the step S203 to the step S204, in the step S204, for the frame, which has undergone the development processing that is not omitted, the CPU 103, which functions as the recording unit, stores (records) the raw data and image data generated by the development processing in the recording medium 106 as one set of photographing data. On the other hand, for the frame, in which all or a part of the development processing is omitted, although its details will be described later, the CPU 103, which functions as the recording unit, records only the raw data on the recording medium 106 or stores (records) one set of photographing data, which is obtained by attaching predetermined image data to the raw data, in the recording medium 106. Further, the image data generated by the development processing (JPEG (Joint Photographic Experts Group) data) is recorded as an image for display (a thumbnail image) of the raw data.

Figure 3:
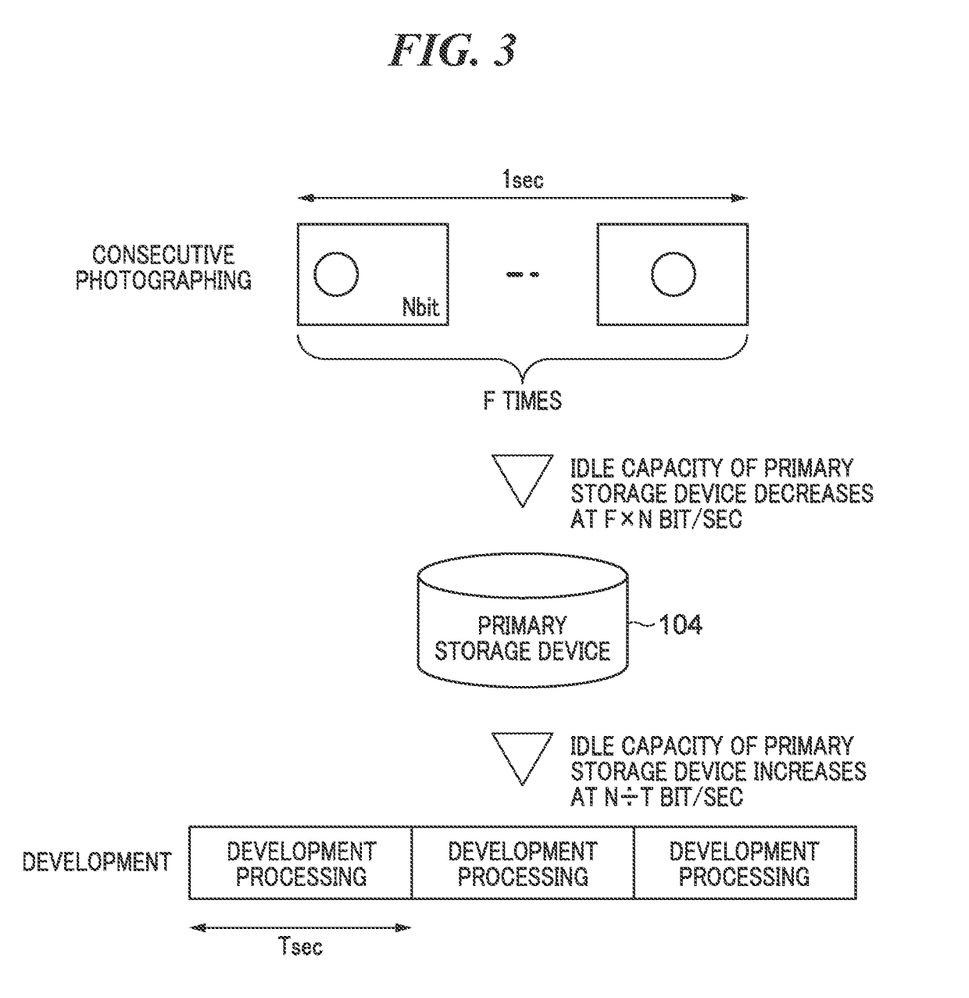
FIG. 3 is a conceptual diagram that shows a situation of securing and releasing an idle capacity of a primary storage device.

Next, the omission judgment of the development processing of the step S200 will be described. FIG. 3 is a conceptual diagram that shows a situation of securing and releasing an idle capacity of the primary storage device 104. As shown in the upper part of FIG. 3, it is assumed that the data capacity of the raw data stored in the primary storage device 104 for each image (each frame) in the consecutive photographing is N [bit], and the number of times of image pickup per second is F [times]. When the consecutive photographing is performed under this condition, the idle capacity of the primary storage device 104 decreases at 'F×N [bit/sec]' per second.

On the other hand, when it is assumed that the time required for the development processing of the raw data of one frame performed by the image processing unit 105 is T [seconds], the number of images that can be developed per second is '1/T'. When the image data generated by the development processing and original raw data thereof are recorded on the recording medium 106, since the original raw data retained in the primary storage device 104 becomes unnecessary, it becomes possible to release a storage area, in which the original raw data was stored. Therefore, when the development processing is performed, the idle capacity of the primary storage device 104 increases at 'N/T [bit/sec]' per second.

In the case that a decreasing speed F×N [bit/sec] of the idle capacity of the primary storage device 104 is equal to or less than an increasing speed N/T [bit/sec] of the idle capacity of the primary storage device 104, since the idle capacity is not running short even if the development processing is continuously performed with respect to the raw data of all frames, it is not necessary to omit the developing processing. On the other hand, in the case that the decreasing speed F×N [bit/sec] of the idle capacity of the primary storage device 104 exceeds the increasing speed N/T [bit/sec] of the idle capacity of the primary storage device 104, when the development processing is continuously performed with respect to the raw data of all frames, the idle capacity is decreasing, and finally the idle capacity is running out. If the idle capacity of the primary storage device 104 is running short or out, since it will not be possible to perform the image pickup of the next frame until the idle capacity is secured, in the case that such a situation may occur, it can be judged that it is necessary to omit the development processing.

In addition, in the case of collectively securing the necessary idle capacity, it may be judged whether or not it is necessary to omit the development processing according to the current idle capacity of the primary storage device 104.

For example, when the consecutive photographing with a fixed (predetermined) number of frames is performed, in the case that the current idle capacity is not sufficient for the capacity required to retain the raw data of all those frames (i.e., the predetermined number of frames), it may be configured to judge that the development processing is omitted without considering the increasing speed of the idle capacity due to the development processing.

Figure 4A:
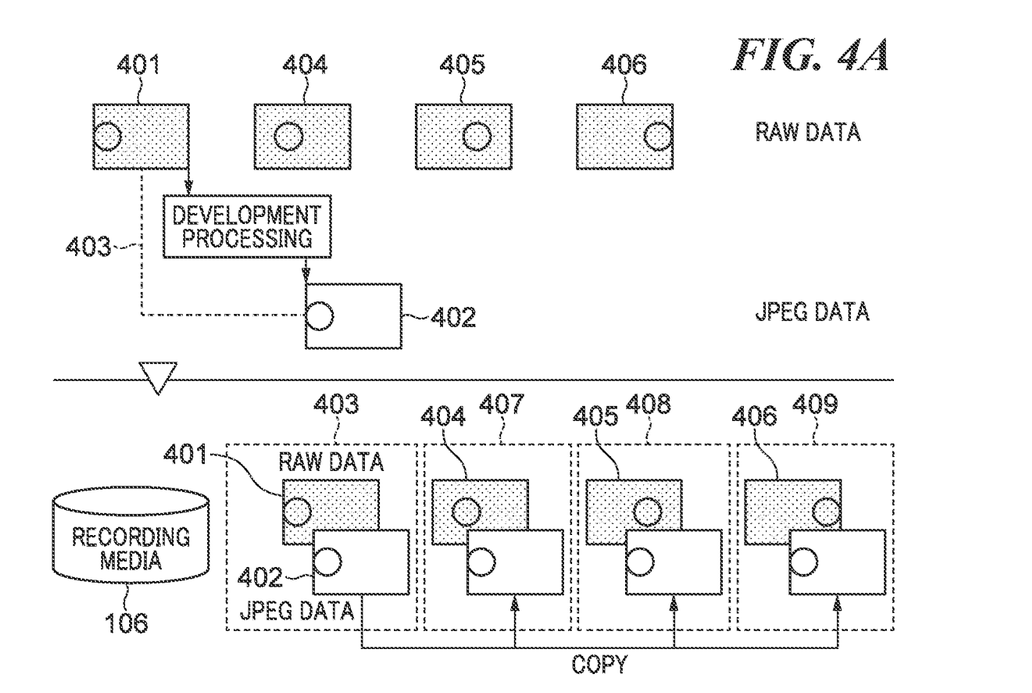
FIGS. 4A and 4B are conceptual diagrams that show a first example and a second example of a development omission processing of a step S203.

Next, the details of the development omission processing of the step S203 will be described. FIG. 4A is a conceptual diagram that shows a first example of the development omission processing. First, when raw data 401 is retained in the primary storage device 104, the image processing unit 105 performs the development processing of the raw data 401, and as a result, JPEG data 402 is generated. In the first example, the raw data 401 and the JPEG data 402 are recorded (stored) in the recording medium 106 as one set of photographing data 403. Moreover, here, although it is assumed that the image data having the JPEG format is generated by the development processing of the raw data 401, the image data generated by the development processing may be image data having another format.

It is assumed that the image pickup of three frames are continuously performed following the image pickup of one frame that triggered the generation of the raw data 401, and raw data 404, raw data 405, and raw data 406 (hereinafter referred to as "the raw data 404 to 406") are generated and then are retained in the primary storage device 104. In this case, when the development processing is performed with respect to the raw data 404 to 406 in the same manner as the raw data 401, the idle capacity of the primary storage device 104 may be running short or out. Therefore, in the first example, the development processing of the raw data 404 to 406 is omitted, and only the raw data 404 to 406 are recorded on the recording medium 106.

Further, since image confirmation after photographing is usually performed by displaying the image on the display unit 108 by using the image data generated by the development processing, in the case that the image data generated by the development processing does not exist, it becomes necessary to generate the image for display on the basis of the raw data. Furthermore, after the photographing, when displaying a list of images, which are obtained by the consecutive photographing, by using the raw data, a large amount of the storage capacity of the primary storage device 104 will be used. In these cases, a large calculation load is also applied to the CPU 103 and the image processing unit 105.

Therefore, the raw data, in which the development processing is omitted, may be combined with image data of an alternative image (hereinafter referred to as "alternative data"), and then stored in the recording medium 106. Specifically, as a modification of the first example, as shown in the lower part of FIG. 4A, first, copy data of the JPEG data 402 is generated as the alternative data. And then, one set of photographing data 407, one set of photographing data 408, and one set of photographing data 409 are generated by combining the copy data with the raw data 404 to 406, and then are recorded on the recording medium 106.

In this case, in the one set of photographing data 407, the one set of photographing data 408, and the one set of photographing data 409, sometimes, image contents such as a position of a main subject on the image are different between the images of the raw data 404 to 406 and the images of the copy data. However, since the raw data 404 to 406 are stored, it is possible to generate the JPEG data corresponding to the raw data 404 to 406 by performing anew the development processing with respect to the raw data 404 to 406 after the image pickup is completed. For example, the development processing may be performed by utilizing the time, during which the image pickup apparatus 100 is not performing the image pickup, or when the photographed image, which is recorded on the recording medium 106, is reproduced by the image pickup apparatus 100 or the external apparatus such as the PC. At that time, if the images of the same JPEG data 402 are continuously displayed in the form of a list, the user can easily recognize that the development processing has not been performed.

Moreover, it is preferred that the one set of photographing data 407, the one set of photographing data 408, and the one set of photographing data 409 include information, which indicates that the development processing is required anew after the image pickup is completed. For attaching such information, for example, a method of writing the raw data 404 to 406 and the copy data of the JPEG data 402 into the header area or the like, a method of writing the raw data 404 to 406 and the copy data of the JPEG data 402 into the index file, or other methods can be used. As the information indicating that the development processing is required, flag information, which simply indicates that the development processing has been omitted, may be added to the image data, or in order to make it possible to identify a type of the development processing omitted, information, which indicates the type of the development processing omitted, may be added to the image data.

Further, as shown in FIG. 4A, in the raw data 401 and 404 to 406, and the JPEG data 402, the main subject is simply represented by a circle mark, and it is clear that the main subject is moving from left to right on the image. In particular, in the one set of photographing data 409, the image content of the raw data 406 and the image content of the copy data are greatly different. In such a case, it is possible to reduce the difference between the image content of the raw data and the image content of the copy data by increasing the number of times of the development as much as possible within a range, in which the number of times of omitting the development processing can be reduced, and this method will be described below as a second example of the development omission processing.

Figure 4B:
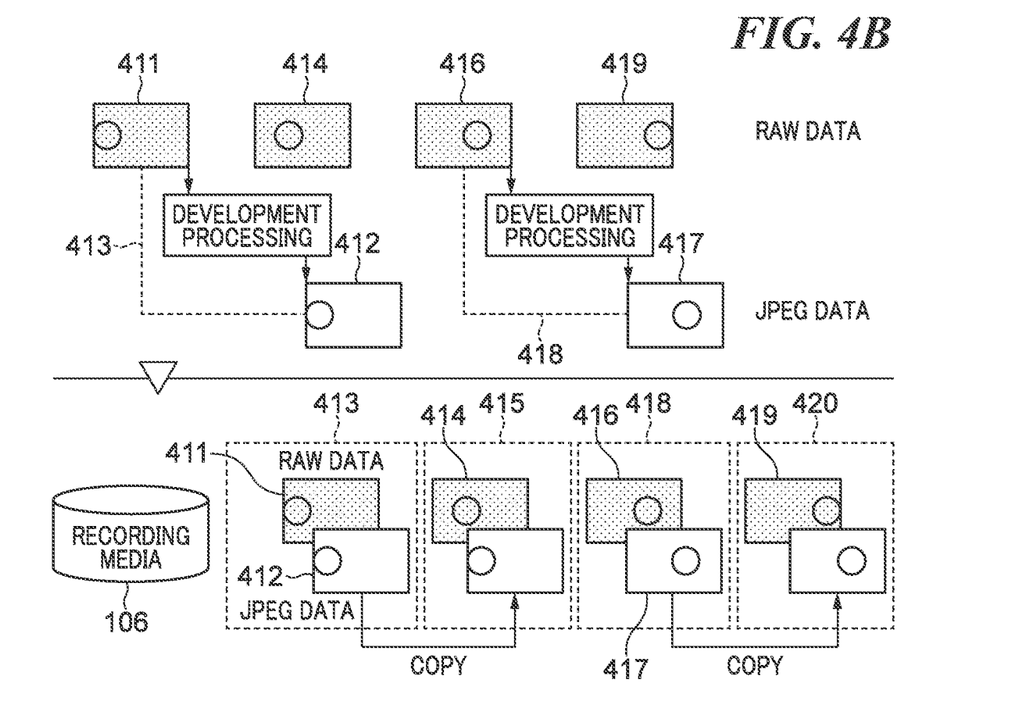

FIG. 4B is a conceptual diagram that shows the second example of the development omission processing. When raw data 411 is retained in the primary storage device 104, the image processing unit 105 performs the development processing of the raw data 411, and as a result, JPEG data 412 is generated. And then, the raw data 411 and the JPEG data 412 are stored (recorded) in the recording medium 106 as one set of photographing data 413.

As with the first example of FIG. 4A, the image pickup of three frames are continuously performed following the image pickup of one frame that triggered the generation of the raw data 411, and raw data 414, raw data 416, and raw data 419 are generated. As with the first example, for the raw data 414, all of the development processing is omitted, and only the raw data 414 is stored (recorded) in the recording medium 106. The raw data 416 and the raw data 419 are processed in the same manner as the raw data 411 and the raw data 414. That is, the development processing of the raw data 416 is performed to generate JPEG data 417, and the raw data 416 and the JPEG data 417 are stored (recorded) in the recording medium 106 as one set of photographing data 418. Further, only the raw data 419 is stored (recorded) in the recording medium 106.

Regarding the first example described above, the modification that the copy data of the JPEG data 402 is added to the raw data 404 to 406, in which the development processing is omitted, has been described. A modification similar to the modification of the first example may be executed for the second example. That is, as shown in the lower part of FIG. 4B, the JPEG data 412 is added to the raw data 414, in which the development processing is omitted, to generate one set of photographing data 415, and then the generated one set of photographing data 415 is stored (recorded) in the recording medium 106. Further, the JPEG data 417 is added to the raw data 419, in which the development processing is omitted, to generate one set of photographing data 420, and then the generated one set of photographing data 420 is stored (recorded) in the recording medium 106.

In this way, by performing one time of the development processing with respect to two times of the image pickup, it is possible to reduce the discrepancy in the image content between the raw data and the copy data, which are combined with each other. However, even in the one set of photographing data 415, the content of the image is different between the raw data 414 and the JPEG data 412. Therefore, in order to show the user that the image content of the copy data is different from the image content of the raw data, a specific mark (for example, a quotation mark or the like) may be added to the image of the copy data, or a display such as inserting a specific character string into a file name (hereinafter referred to as "a difference display") may be applied to the image of the copy data. As a result, when performing the development processing of the undeveloped raw data, the user can easily find out the raw data to be developed from the JPEG image.

Moreover, the difference display in the one set of photographing data is not a display, which is applicable only to the JPEG data being the copy data. For example, in order to display the content of the raw data, the difference display may be performed with respect to the image for display, which is added to the raw data, or an image specified by the multi-picture format (CIPA DC-X007-2009), which is added to the raw data. As for the difference display for these images, the image data of the previous image pickup (frame) may be diverted in the same manner as the methods shown in FIGS. 4A and 4B, or the storage capacity required for the image of the main body obtained by the development processing may be secured by a single-color image such as a white image, or the like, and the image of the main body obtained by the development processing may be recorded on the recording medium 106.

In the development omission processing described above, since images of X frames can be processed in one time of development time, the increasing speed of the idle capacity of the primary storage device 104 becomes '(N/T)×X [bit/sec]'. Therefore, it is possible to calculate as 'X=(F×N)/(N/T)' based on the decreasing speed F×N [bit/sec] of the primary storage device 104 and the increasing speed N/T of the primary storage device 104. Moreover, it is preferred that the value of X is rounded up to the nearest whole number, so that it is possible to avoid a situation, in which the idle capacity of the primary storage device 104 is running short or out.

Not limited to this, it may be judged whether or not the development processing of the raw data can be omitted based on a similarity degree between the images obtained by the consecutive photographing. For example, a configuration, in which since the raw data 401 and the raw data 404 have a high similarity degree between images, the JPEG data 402 is copied, and on the other hand, since the raw data 401 and the raw data 405 have a low similarity degree between images, the development processing is also performed with respect to the raw data 405, may be adopted. Moreover, the similarity degree between images is judged by using an existing similar image judging method, for example, a method that an image having a small difference between images is judged to have an increase in the similarity degree.

As described above, in the first example and the second example of the development omission processing, by omitting the development processing, it is possible to suppress the occurrence of the situation, in which the idle capacity of the primary storage device 104 is running short. As a result, when performing the consecutive photographing or the like, the user can perform the image pickup without worrying that the image pickup will be interrupted due to the shortage of the idle capacity in the primary storage device 104.

Further, as described above, in the first example and the second example of the development omission processing, all of the development processing has been omitted for the raw data of one frame. However, not limited to such a method, it is also possible to avoid the occurrence of the situation, in which the idle capacity of the primary storage device 104 is running short or out, by partially omitting the contents of the development processing. Further, in the first example of the development omission processing, for example, in the one set of photographing data 409, a large discrepancy occurs in the image content (for example, the position of the main subject) between the raw data 406 and the copy data, and it is assumed that there is a need to suppress such a discrepancy. Therefore, next, as a third example of the development omission processing, a method of omitting a part of the contents of the development processing will be described.

Figure 5:
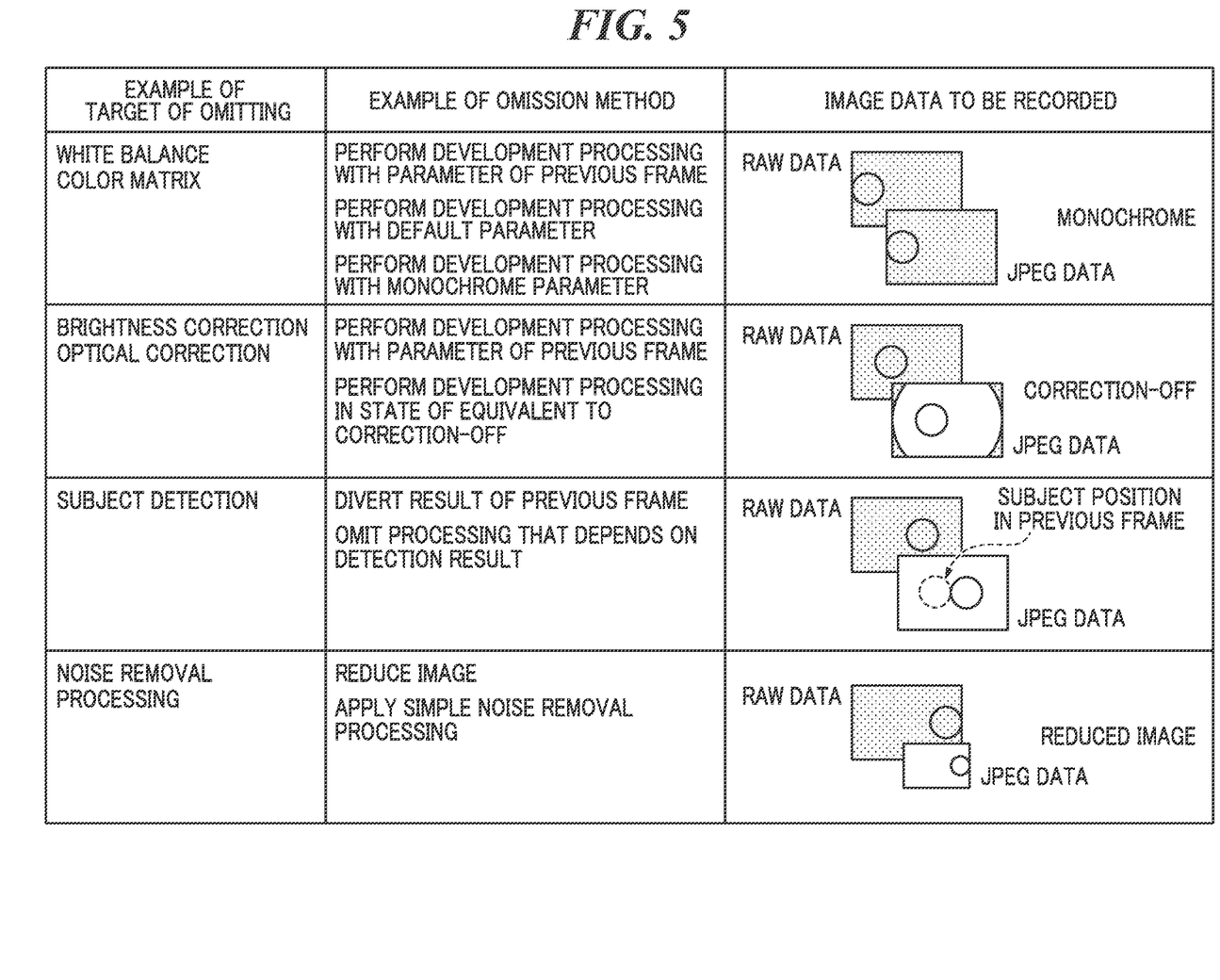
FIG. 5 is a figure that shows a third example of the development omission processing of the step S203.

FIG. 5 is a figure that shows the third example of the development omission processing. Examples of a first omission target include processing related to image color such as white balance and color matrix. As an omission method, the processing itself of changing the color may be omitted. Further, in the case that the white balance or the like is determined based on information detected from the image, the detection processing itself may be omitted. It is also possible to use a method, in which the development processing is performed by using parameters used in the development processing of the previous frame that the development processing is not omitted, or default fixed parameters. Further, the development processing may be performed so as to become monochrome so that the user can easily recognize that the processing that affects the color is omitted in the development processing.

Examples of a second omission target include processing of brightness correction and optical correction. Examples of the omission method include a method, in which the development processing is performed by using the parameters used in the development processing of the previous frame that the development processing is not omitted. Further, the examples of the omission method include a method, in which a correction processing is omitted (equivalent to correction-off) and the development processing is performed. Moreover, when the development processing is performed in a state of equivalent to the correction-off, something that wouldn't normally appear within the angle of view may be reflected, and thus resulting in an unfavorable image. Therefore, a configuration, in which the user can select whether or not the development processing is performed in the state of equivalent to the correction-off, may be adopted.

Examples of a third omission target include various kinds of detection processing such as subject detection by a face detection processing or the like. For example, in the case of controlling the brightness of the image and the white balance of the image based on a face luminance and a face color that are detected, the detection processing is performed by using the parameters used in the development processing of the previous frame that the development processing is not omitted. Moreover, the processing that depends on (is related to) the processing result of the subject detection may be omitted.

Examples of a fourth omission target include a noise removal processing. For example, although the noise removal processing itself may be omitted, in this case, since noises become conspicuous, it is preferred to obtain a noise reduction effect by reducing the image, etc. Further, it may be configured to perform a simple noise removal processing.

In the case of partially omitting or simply performing the contents of the development processing in this way, for example, a judgment that which processing element is omitted or simply performed may be performed on the basis of a status of the idle capacity of the primary storage device 104 and a development processing time. As a specific example, it is assumed that among a time T [seconds] required for the entire development processing applied to the picked-up image of one frame by the image processing unit 105, a time required for a certain processing element y is Ty [seconds]. In this case, the time T [seconds] required for the completion of the development processing, in which a plurality of processing elements 1, 2, 3, . . . are performed, can be expressed as 'T=T1+T2+T3+ . . . '. Here, in the case of omitting the processing element 1 and the processing element 2, since the time required for the developing processing becomes 'T−T1−T2', the increasing speed of the idle capacity of the primary storage device 104 becomes {N/(T−T1−T2)}.

Therefore, it is preferred to determine the processing element to be omitted based on the decreasing speed F×N [bit/sec] of the idle capacity of the primary storage device 104 so that a relationship of '{N/(T−T1−T2)}>F×N' holds. As a result, although it is different from the image obtained by performing the development processing without omission with respect to the raw data, an image having similar contents can be obtained, and based on the obtained image, the user can easily find out the raw data to be developed later without omission.

Which processing element to be omitted or simply performed in the image processing may be judged by setting a priority ranking for each processing element and based on a usage rate (the idle capacity) of the primary storage device 104. For example, a processing of correcting the distortion of the frame (hereinafter referred to as "a processing D") has a greater influence on the appearance of the processed image than a processing of correcting a decrease in marginal illumination of the frame (hereinafter referred to as "a processing V"). Therefore, the processing V is set to be omitted preferentially over the processing D, in the case that the usage rate of the primary storage device 104 is equal to or less than a predetermined threshold value, the processing V can be set to be omitted, and on the other hand, in the case that the usage rate of the primary storage device 104 becomes larger than the predetermined threshold value, such a setting of omitting the processing D in addition to the processing V is also possible. Of course, the priority ranking of the processing element to be omitted and the threshold value of the usage rate of the primary storage device 104 may be determined based on both the processing time and the influence on the appearance of the processed image.

Moreover, in the third example of the development omission processing, as with the first example and the second example of the development omission processing, information, which indicates that the development processing is required anew later, can also be added to the file name after the development, or it is also possible to add the specific mark to the image generated by the development processing. Further, in the case that the third example is applied, the information indicating which processing is omitted may be left in the file name or the image. By taking such measures, for example, in the case that there is an image, in which the processing D having a large influence on the appearance is omitted, and an image, in which the processing V having a small influence on the appearance is omitted, the user can easily judge that the development processing is performed preferentially with respect to the image, in which the processing D is omitted. In addition, by adding the specific mark, which indicates the omitted processing, to the image, such effects can be obtained, that is, when the user views the image, the user can easily imagine how much the image deviates from the original image.

In this way, by adopting the third example of the development omission processing, it is possible to suppress the occurrence of the situation, in which the idle capacity of the primary storage device 104 is running short or out, and it becomes possible for the user to perform the consecutive photographing without worry.

The present invention is characterized in that the raw data of the photographed images continuously obtained is temporarily stored in the primary storage device (the storage unit), it is judged whether or not to omit all or a part of the development processing with respect to the image data based on the usage status of the primary storage device or the similarity degree between the images of the raw data, and the development processing is performed according to the judgment result. In other words, the present invention is characterized by the control of the development processing, and the image pickup unit of the present invention, which includes the image pickup element and the image pickup optical system, has no substantial feature. Therefore, the present invention is not limited to the image pickup apparatus, but can be applied to an electronic apparatus capable of obtaining the images, which are obtained by the consecutive photographing, from an image pickup unit by means of wired communications or wireless communications, and performing the development processing with respect to the obtained images.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-202701, filed Dec. 7, 2020, which is hereby incorporated by reference herein in its entirety.

What is claimed is:
1. An image pickup apparatus comprising:
  an image pickup sensor configured to continuously perform image pickup and obtain raw data;
  a working memory configured to temporarily store the raw data; and
  a memory and at least one processor which functions as:
    a developing unit configured to develop the raw data; and
    a control unit configured to control so as to omit a part or all of a development processing of the raw data performed by the developing unit based on a usage status of the working memory or a similarity degree between images of the raw data, and
    a recording unit configured to record the raw data on a recording medium,
  wherein in a case that all of the development processing is omitted, the recording unit records only the raw data on the recording medium or records the raw data and alternative data on the recording medium, and
  in a case that the development processing is not omitted or in a case that a part of the development processing is omitted, the recording unit records the raw data and image data, which is obtained by the development processing performed with respect to the raw data, on the recording medium.

2. The image pickup apparatus according to claim 1, wherein the control unit controls so as to omit a part or all of the development processing of the raw data performed by the developing unit based on the usage status of the working memory, and
the usage status of the working memory is an idle capacity of the working memory.

3. The image pickup apparatus according to claim 1, wherein the control unit controls so as to omit a part or all of the development processing of the raw data performed by the developing unit based on the usage status of the working memory, and
the usage status of the working memory is either a relationship between a decreasing speed of an idle capacity of the working memory due to obtaining of the raw data and an increasing speed of the idle capacity of the working memory due to the developing unit, or the idle capacity required for consecutive photographing with a predetermined number of frames.

4. The image pickup apparatus according to claim 1, wherein the control unit controls so as to omit a part or all of the development processing of the raw data performed by the developing unit based on the similarity degree between the images of the raw data.

5. The image pickup apparatus according to claim 1, wherein the alternative data is the image data generated by the development processing performed with respect to the raw data of image photographed before the raw data, which is recorded together with the alternative data.

6. The image pickup apparatus according to claim 1, wherein the control unit adds information, which indicates that the part of the development processing is omitted, to the image data, which is generated by omitting the part of the development processing.

7. The image pickup apparatus according to claim 6, wherein the control unit adds information, which indicates the part of the development processing that has been omitted, to the image data, which is generated by omitting the part of the development processing.

8. The image pickup apparatus according to claim 1, wherein the control unit adds information, which indicates that all of the development processing is omitted, to the alternative data.

9. The image pickup apparatus according to claim 1, wherein the development processing includes a plurality of processes, and
the control unit determines a process to be omitted among the plurality of processes based on the usage status of the working memory.

10. The image pickup apparatus according to claim 9, wherein the control unit determines the process to be omitted among the plurality of processes based on the usage status of the working memory and processing times of the plurality of processes.

11. The image pickup apparatus according to claim 10, wherein the control unit determines the process to be omitted among the plurality of processes based on the usage status of the working memory and priority rankings of the plurality of processes.

12. A control method for an image pickup apparatus, comprising:
an image pickup step of continuously performing image pickup and obtaining raw data;
a storage step of temporarily storing the raw data in a storage device;
a developing step of developing the raw data;
a control step of controlling so as to omit a part or all of a development processing of the raw data performed in the developing step based on a usage status of the storage device or a similarity degree between images of the raw data; and
a recording step of recording the raw data on a recording medium,
wherein in a case that all of the development processing is omitted, the recording step records only the raw data on the recording medium or records the raw data and alternative data on the recording medium, and
in a case that the development processing is not omitted or in a case that a part of the development processing is omitted, the recording step records the raw data and image data, which is obtained by the development processing performed with respect to the raw data, on the recording medium.

13. A non-transitory computer-readable storage medium storing a program for causing a computer to execute a control method for an image pickup apparatus, comprising:
an image pickup step of continuously performing image pickup and obtaining raw data;
a storage step of temporarily storing the raw data in a storage device;
a developing step of developing the raw data; and
a control step of controlling so as to omit a part or all of a development processing of the raw data performed in the developing step based on a usage status of the storage device or a similarity degree between images of the raw data; and
a recording step of recording the raw data on a recording medium,
wherein in a case that all of the development processing is omitted, the recording step records only the raw data on the recording medium or records the raw data and alternative data on the recording medium, and
in a case that the development processing is not omitted or in a case that a part of the development processing is omitted, the recording step records the raw data and image data, which is obtained by the development processing performed with respect to the raw data, on the recording medium.

* * * * *